United States Patent
Cope et al.

(10) Patent No.: US 9,106,267 B1
(45) Date of Patent: Aug. 11, 2015

(54) NEAR FIELD COMMUNICATION SESSION FEEDBACK

(75) Inventors: Warren B. Cope, Olathe, KS (US); William Michael Parsel, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 788 days.

(21) Appl. No.: 13/326,941

(22) Filed: Dec. 15, 2011

(51) Int. Cl.
*H04B 5/00* (2006.01)

(52) U.S. Cl.
CPC .................................. *H04B 5/00* (2013.01)

(58) Field of Classification Search
USPC .......... 455/41.1, 41.2, 41.3, 566, 567, 556.1, 455/556.2; 340/13.24, 13.25, 13.26, 13.31
See application file for complete search history.

(56) References Cited

U.S. PATENT DOCUMENTS

| | | | | |
|---|---|---|---|---|
| 7,872,995 | B2* | 1/2011 | Fujii et al. | 370/310 |
| 8,102,797 | B2* | 1/2012 | Abel | 370/328 |
| 8,311,478 | B2* | 11/2012 | Bloebaum et al. | 455/41.1 |
| 8,710,966 | B2* | 4/2014 | Hill | 340/407.1 |
| 2006/0205394 | A1 | 9/2006 | Vesterinen | |
| 2007/0032270 | A1 | 2/2007 | Orr | |
| 2010/0261509 | A1 | 10/2010 | Kovvali et al. | |
| 2011/0130173 | A1 | 6/2011 | Im et al. | |
| 2011/0163860 | A1 | 7/2011 | Ryu et al. | |
| 2012/0040609 | A1* | 2/2012 | Griffin et al. | 455/41.1 |
| 2012/0309302 | A1* | 12/2012 | Buhot | 455/41.1 |

* cited by examiner

*Primary Examiner* — Tuan A Tran

(57) ABSTRACT

A mobile phone comprising a cellular communication radio transceiver, a near field communication (NFC) radio transceiver, a processor, a memory, and an application stored in the memory. When executed by the processor, the application presents an indication of the initiation and an indication of the conclusion of a communication link between the near field communication radio transceiver and a near field communication transceiver external to the mobile phone.

19 Claims, 7 Drawing Sheets

NEAR FIELD COMMUNICATION SESSION FEEDBACK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Near field communication (NFC) refers to short-range wireless radio communication based on NFC standards. While the term 'short-range' is not precisely defined, the maximum distance for NFC radio communication is about 20 centimeters (about 8 inches) at the time of filing of this patent application. Without limitation, NFC radio communication typically occurs over distances on the order of 4 centimeters (about 1.5 inches). NFC is an open platform technology that is governed by the ECMA-340 standard and the ISO/IEC 18092 standard. It is understood that NFC standards continue to evolve as the technology and applications of the technology are elaborated and refined.

NFC radio communication may be used for financial transactions such as completing a payment transaction from a mobile phone encapsulating an electronic credit card and/or debit card to a point-of-sale (POS) terminal. NFC radio communication may be used to provide personal identification and/or to electronically access physical spaces, for example to provide a student identification, an employee identification, a medical identification; to activate a badge reader to unlock an entry door; to access a hotel room; to access a rental car. NFC radio communication may be used for communicating content such as reading explanatory information from an NFC tag coupled to a placard in a museum or in a retail display. NFC radio communication may be used for downloading an audio or video presentation, for example an audio tour of a museum or other exhibition. Payment transactions and access NFC sessions may be short lived, for example beginning and ending in less than three seconds. Communication NFC sessions may be longer lived and may take place over tens of seconds or over more than a minute of time. As the size of data transferred over NFC communication sessions increases, it can be expected that the time duration of communication NFC sessions will increase.

SUMMARY

In an embodiment, a mobile phone is disclosed. The mobile phone comprises a cellular communication radio transceiver, a near field communication (NFC) radio transceiver, a processor, a memory, and an application stored in the memory. When executed by the processor, the application presents an indication of the initiation and an indication of the conclusion of a communication link between the near field communication radio transceiver and a near field communication transceiver external to the mobile phone.

In an embodiment, a method of a mobile phone conducting a near field communication session is disclosed. The method comprises establishing a near field communication radio link between a near field communication radio transceiver of the mobile phone and a near field communication radio transceiver external to the mobile phone, transmitting a message from the near field communication radio transceiver of the mobile phone to an application executing on a processor of the mobile phone indicating the initiation of the near field communication radio link, and, in response to receiving the message, presenting an indication of the established near field communication radio link on the mobile phone by the application.

In an embodiment, a mobile phone is disclosed. The mobile phone comprises a near field communication radio transceiver, a processor, a memory, and an application stored in the memory that, when executed by the processor, presents feedback throughout the duration of a communication session of the near field communication radio transceiver.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches presenting an indication of the initiation of a near field communication (NFC) radio link to a user of an electronic device. The presentation of this feedback to the user may be continued from the initiation of the NFC radio link until the NFC radio link is terminated or taken down. The indication may comprise one or more of a mechanical vibration, an audible tone, a light, or a message presented on a display of the electronic device. This feedback is particularly useful as time duration of the NFC radio link session increases, for example when an NFC radio link is used to download or read content such as audio or video presentations. Without NFC feedback a user may think that the NFC radio link session has completed, move the electronic device away, and break the NFC radio link before the NFC radio link session has been completed. Alternatively, without NFC feedback, a user may think that the NFC radio link has been established, when in fact it has not been established, and waste time standing around waiting for the NFC radio link session to complete.

In an embodiment, the electronic device may present an NFC radio link session initiated feedback and present a different NFC radio link session completed feedback. In this embodiment, the NFC radio link session initiated feedback may be presented and then stopped, while the NFC radio link session continues or the NFC radio link session initiated feedback may continue to be presented until the end of the NFC radio link session. The NFC radio link session completed feedback may be different from the kind of feedback used to signal the initiation of the NFC radio link session. For example, in an embodiment, the NFC radio link session completed feedback may be configured to attract the attention of the user of the electronic device while that user may be focused on something else. For example, the NFC radio link session completed feedback may present a bright light or a flashing light. Alternatively the NFC radio link session completed feedback may present a loud audible tone or alternating audible tone.

Figure 1:
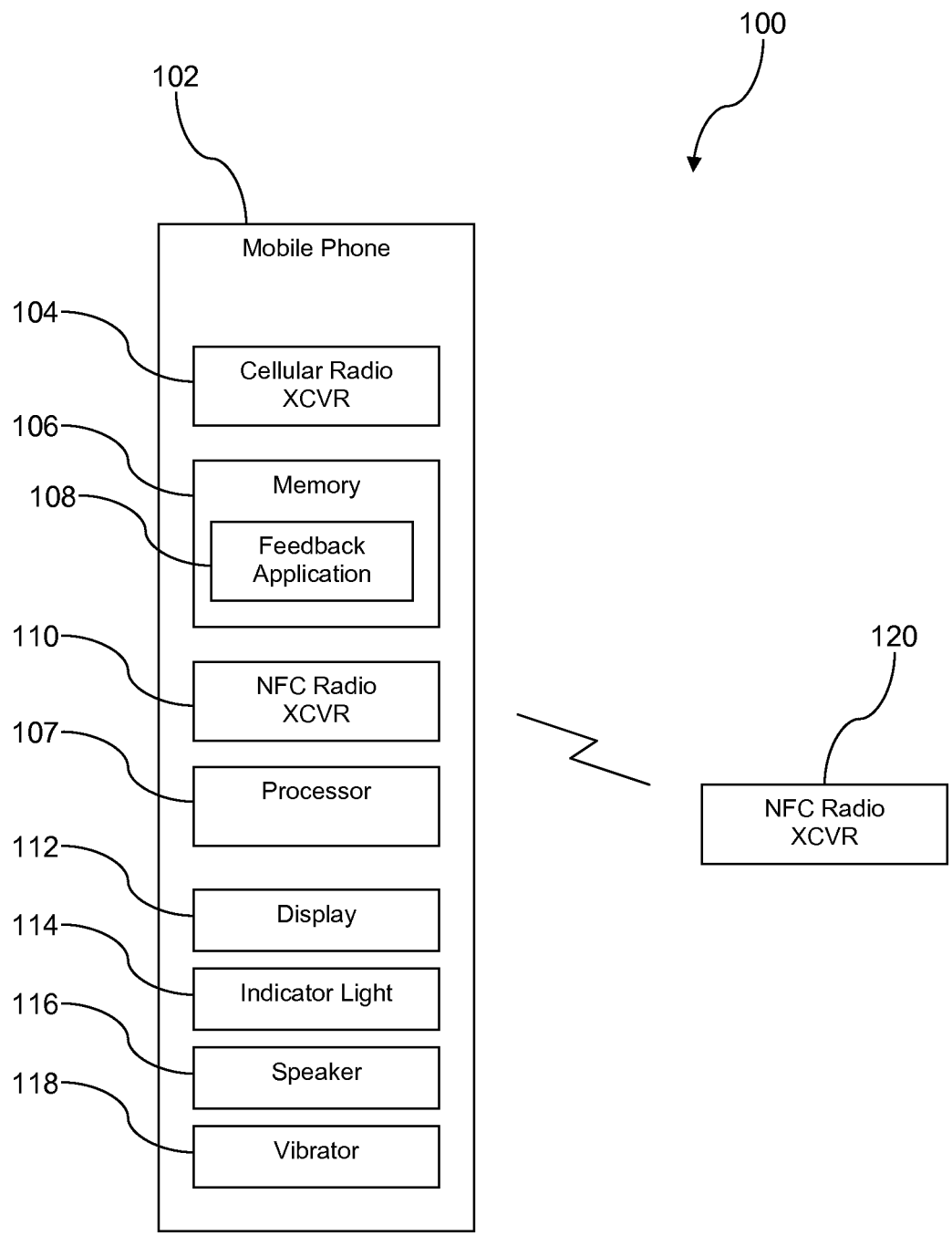
FIG. 1 is an illustration of a communication system according to an embodiment of the disclosure.

Turning now to FIG. 1, a system 100 is described. In an embodiment, the system 100 comprises a mobile phone 102 and an external NFC radio transceiver 120. While the description herein relates to the mobile phone 102, it is understood that in other embodiments another electronic device may embody the features taught by the present disclosure, for example a personal digital assistant (PDA), a media player, or other electronic device. The mobile phone 102 comprises a cellular radio transceiver 104, a memory 106, and a NFC radio transceiver 110. The mobile phone 102 may further comprise one or more of a display 112, an indicator light 114, a speaker 116, and a vibrator 118. A feedback application 108 may be stored in the memory 106 and executed by a processor 107 of the mobile phone 102.

The cellular radio transceiver 104 is operable to establish wireless radio communications with a cellular tower or base transceiver station (BTS) to engage in voice communication and/or data communication. The cellular radio transceiver 104 may establish radio links with a plurality of cellular towers as the mobile phone 102 changes location in a process known by those skilled in the art as hand-off. For example as a user of the mobile phone 102 driving in his or her car engages in a telephone conversation, a radio link may be established between the cellular radio transceiver 104 and a first cellular tower to bear the voice traffic to a landline network and as the car changes location the cellular radio transceiver 104 may hand-off to a second cellular tower without interrupting the on-going telephone conversation. In contrast to NFC radio communication, which may communicate at ranges limited to about 8 inches or less, the cellular radio transceiver 104 communicates wirelessly with cellular towers at ranges typically in excess of 100 feet and extending to 3 kilometers or more. The cellular radio transceiver 104 may communicate with a cellular tower using one of a code division multiple access (CDMA) wireless communication protocol, a global system for mobile communications (GSM) wireless communication protocol, a long-term evolution (LTE) wireless communication protocol, or a worldwide interoperability for microwave access (WiMAX) wireless communication protocol.

The NFC radio transceiver 110 is configured to perform near field communication in conformance with one or more NFC standards over short-ranges, for example less than about 8 inches. Without limitation, it is contemplated that the NFC radio transceiver 110 may promote completing payment transactions with point-of-sale (POS) terminals (not shown) external to the mobile phone 102, for example payment based on a credit card and/or a debit card known to the mobile phone 102 and/or stored in a secure element (SE) of the mobile phone 102. The NFC radio transceiver 110 may promote providing identification information and/or access credentials, for example to gain entry to a hotel room, to operate a rental car, to pass a badge reader to enter a locked area. The NFC radio transceiver 110 may promote downloading content such as descriptive information related to an exhibited item or a retail item or such as an audio and/or video tour content.

The external NFC radio transceiver 120 may comprise a variety of devices. The external NFC radio transceiver 120 may be associated with a point-of-sale terminal at a check-out station in a grocery store or other retail store. The external NFC radio transceiver 120 may be an NFC tag coupled to a poster on a public kiosk where the NFC tag contains no on-board power source and is instead powered by a radio frequency signal radiated by the NFC radio transceiver 110. The external NFC radio transceiver 120 may be a scanner or reader at a badged access point for entering a building. The external NFC radio transceiver 120 may be a scanner in a rental car that enables the ignition push-button of the rental car.

In an embodiment, the types of communications supported by the NFC radio transceiver 110 may be categorized as financial, access, and communicative. Financial and access NFC may be completed in about 3 seconds or less. The success or failure of an attempt of financial or access NFC can be determined relatively quickly. If the user doesn't see confirmation that the NFC payment has been completed in about 3 seconds, he or she can assume that the NFC financial transaction did not happen. Maybe they didn't bring their mobile phone 102 close enough to the point-of-sale terminal and should try again. Likewise, if the user doesn't get access to the locked door within about 3 seconds, maybe the scanner didn't engage with the NFC radio transceiver 110 and the user should hold the mobile phone 102 close to the door scanner again. Communicative NFC, however, may take place over a period of time up to 15 seconds or more. A user may be left waiting for an extended period of time without knowing that a desired communicative NFC session had never started, perhaps due to not holding the mobile phone 102 close enough to an NFC tag or to the external NFC radio transceiver 120. By the time the user learns that the NFC session did not occur, they have wasted time. Alternatively, the user may assume the NFC session has completed, move the mobile phone 102 away from the external NFC radio transceiver 120, and unintentionally interrupt the on-going NFC session. In this case, the user must redo the NFC session, again wasting time. What is needed is a definite indication of the initial establishment of the NFC radio link.

In an embodiment, when the NFC radio transceiver 110 establishes a radio link, for example an NFC radio link with the external NFC radio transceiver 120 or with a NFC tag, the mobile phone 102 presents feedback to the user. For example, when the NFC radio transceiver 110 establishes a radio link the display 112 may present a message or a graphical representation indicating the NFC radio link has been initiated; the indicator light 114 may illuminate and/or blink; the speaker 116 may produce an audible tone, repeat an audible tone periodically, and/or maintain a continuous audible tone; or the vibrator 118 may activate. It is understood that the audible tone may comprise an audio recording rather than a simple single tone or a simple combination of a plurality of single tones. For example, the audible tone may be a short voice message or a musical recording. In an embodiment, the audio recording may continuously repeat. Thus, when the user of the NFC radio transceiver 110 perceives the presented feedback, they will know that the desired NFC radio link has been established and that the intended NFC activity is underway. Likewise, when the user of the NFC radio transceiver 110 perceives that the feedback has not been presented, they will know immediately that the desired NFC radio link has not been established and will take appropriate action promptly, for example bringing their mobile phone 102 and/or the NFC radio transceiver 110 closer to the external NFC radio transceiver 120.

The feedback application 108 may receive a message from the NFC radio transceiver 110 at the onset of a NFC radio link session, and the feedback application 108 may cause the presentation of feedback by one or more of the devices 112, 114, 116, 118. In an embodiment, the message sent by the NFC radio transceiver 110 may indicate a size of the NFC communication that is expected to occur, and the feedback application 108 may estimate based on this information how long the NFC radio link will be maintained and continue to present the feedback for this estimated duration of time. Alternatively, the NFC radio transceiver 110 may send another message on the termination of the NFC radio link, and the feedback application 108 may use this message to halt the presentation of feedback. Alternatively, the feedback application 108 may only present feedback on the initiation of the NFC radio link and not attempt to provide feedback about the on-going progress or continuation of the NFC radio link session. The feedback application 108 may present NFC radio link session initiated feedback when the NFC radio link is first established and may present NFC radio link session completed feedback when the NFC radio link is taken down, as on the completion of the NFC radio link session. The NFC radio link session completed feedback may be composed of vibration indication, indicator light indication, audible tone, presentation on the display 112, or a combination thereof. The feedback application 108 may continue to present the NFC radio link session initiated feedback as the NFC radio link session continues or progresses. Alternatively, the feedback application 108 may discontinue the NFC radio link session initiated feedback after the NFC radio link has been established and before the NFC radio link session has completed. The feedback application 108 may present a NFC radio link session in-progress feedback that is different from the NFC radio link session initiated feedback and/or different from the NFC radio link session completed feedback.

Figure 2:
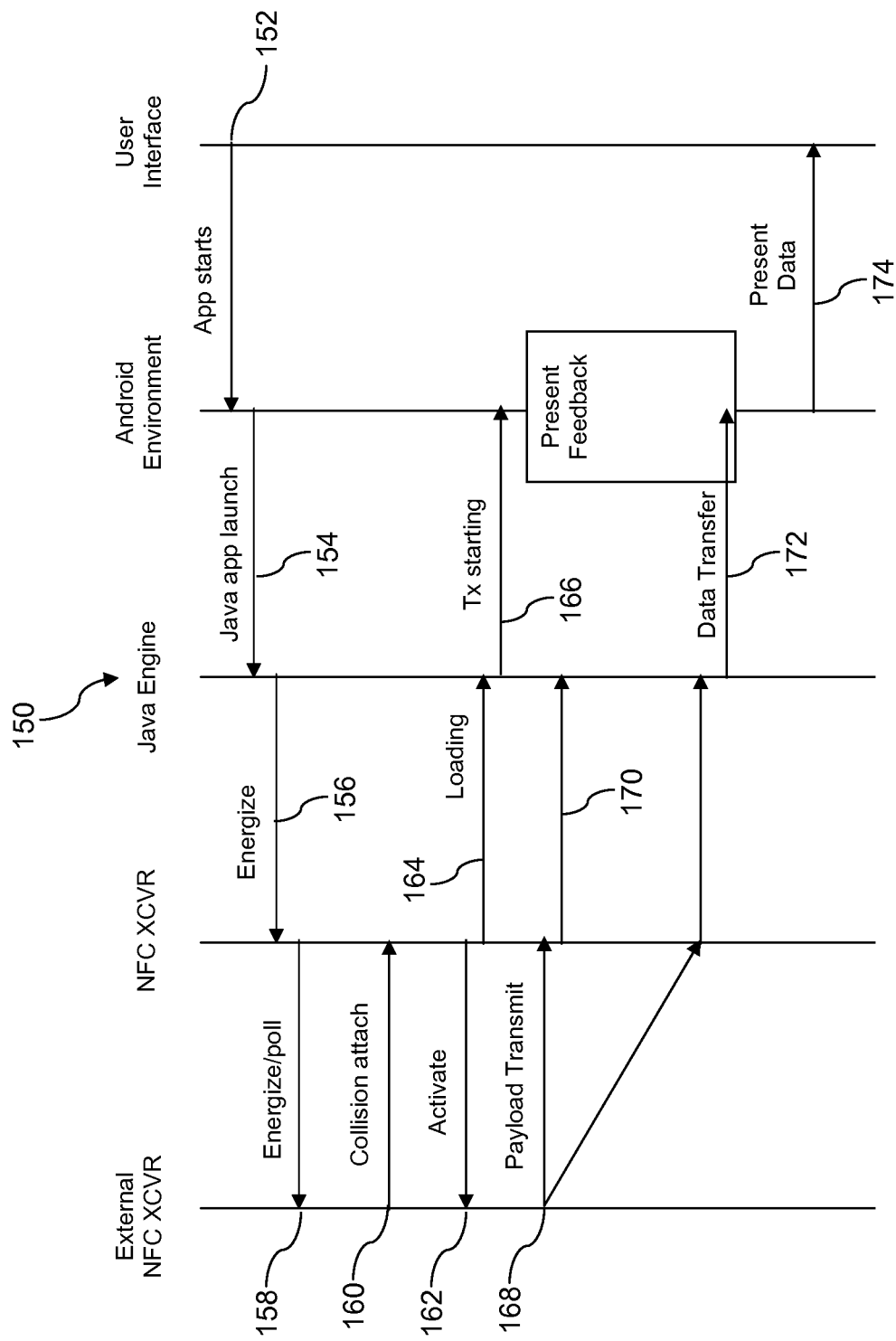
FIG. 2 is an illustration of a message sequence according to an embodiment of the disclosure.

Turning now to FIG. 2, a message sequence 150 is described. In an embodiment, the message sequence 150 may promote implementing NFC feedback to a user. A user interface of the mobile phone 102 may receive a user input to select a NFC communication function of the mobile phone 102. An application start message 152 may be sent from the user interface to the operating system of the mobile phone 102, for example an Android environment. The operating system, for example the Android environment, may send a Java application launch message 154 to a Java engine associated with the NFC radio transceiver 110. The Java engine may send an energize message 156 to the NFC radio transceiver 110. The NFC radio transceiver 110 may send an energize and/or poll message 158 to the external NFC radio transceiver 120.

The external NFC radio transceiver 120 sends a collision attach message 160 back to the NFC radio transceiver 110. The NFC radio transceiver 110 sends an activate message 162 to the external NFC radio transceiver 120. The NFC radio transceiver 110 sends a loading message 164 to the Java engine, and the Java engine sends a transmission starting message 166 to the Android environment. The feedback application 108, which may execute in the Android environment, is notified of the transmission starting message 166 and begins presenting feedback. For example, in response to the transmission starting message 166, the feedback application 108 may cause the display 112, the indicator light 114, the speaker 116, and/or the vibrator 118 to present feedback. It is understood that in a different embodiment or under different communication scenarios a different series of message handshakes may occur.

The external NFC radio transceiver 120 transmits information in a payload transmit message 168 or a plurality of payload transmit messages for an extended duration of time to the NFC radio transceiver 110, and the NFC radio transceiver 110 transmits this information in message 170 or a plurality of messages to the Java engine. When the information transmission is complete, the Java engine transfers the data received in message 172 to the Android environment, and the Android environment provides the data to the user interface in message 174 for presentation by the user interface.

Figure 3:
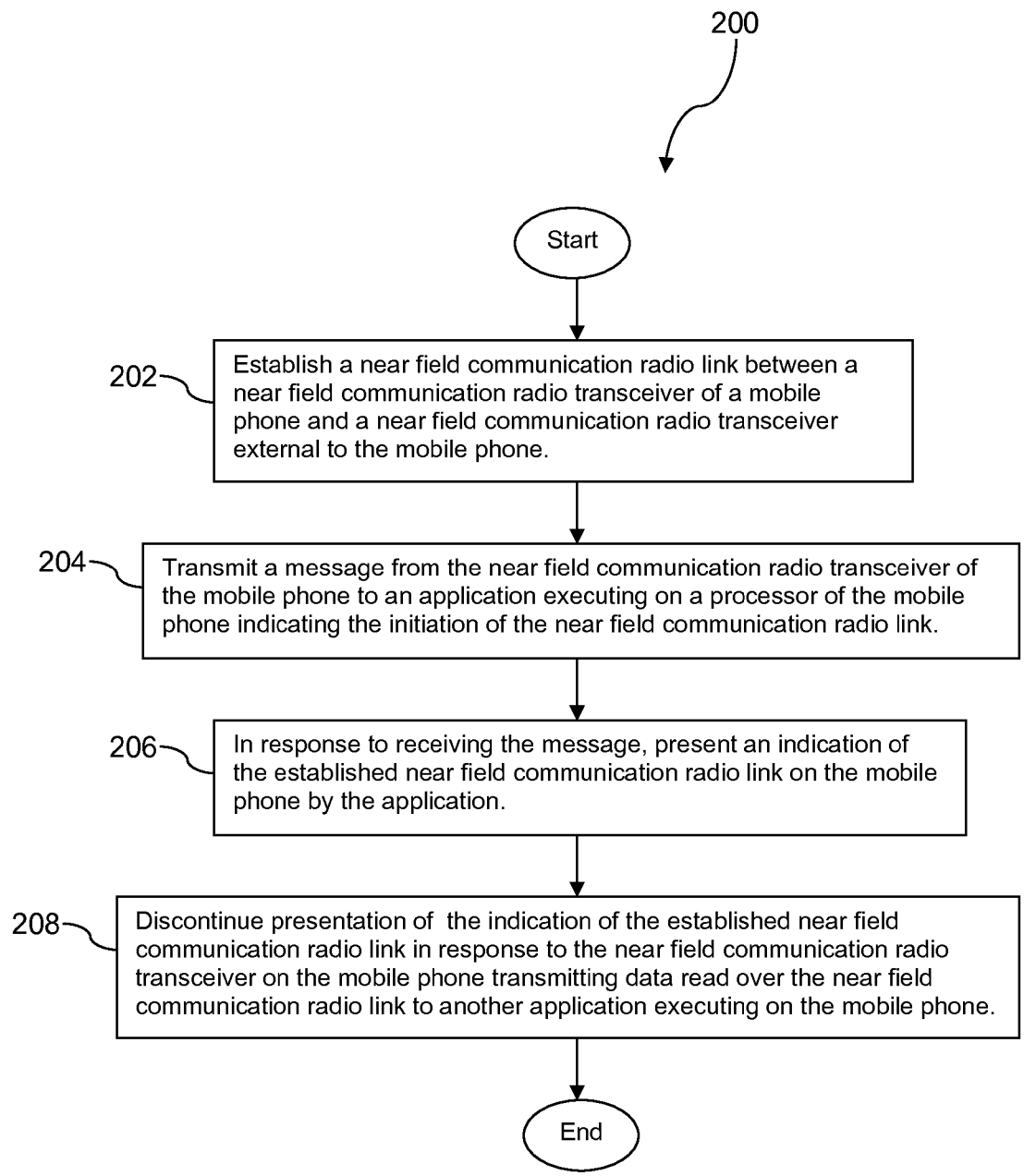
FIG. 3 is a flow chart illustrating a method according to an embodiment of the disclosure.

Turning now to FIG. 3, a method 200 is described. At block 202, a near field communication radio link is established between the NFC radio transceiver 110 of the mobile phone 102 and the external NFC radio transceiver 120. At block 204, a message is transmitted from the NFC radio transceiver 110 to the feedback application 108 indicating the initiation of the near field communication radio link. It is understood that the message may transit through a number of intermediate components and/or devices of the mobile phone 102 in passing from the NFC radio transceiver 110 to the feedback application 108.

At block 206, in response to receiving the message, the feedback application 108 presents an indication of the established near field communication radio link on the mobile phone 102. For example, the feedback application 108 may present a message or graphic indication on the display 112 of the mobile phone 102. The feedback application 108 may cause the indicator light 114 to illuminate or to flash. The feedback application 108 may cause the speaker 116 to emit a characteristic audio tone and/or to repeat the audio tone. The feedback application 108 may cause the vibrator 118 to activate and to vibrate. In an embodiment, the presentation of feedback may be transient and only occur at the onset of the establishment of the near field communication radio link. Alternatively, in an embodiment, the presentation of feedback may continue as long as the near field communication radio link continues. At block 208, presentation of the indication of the established near field communication radio link is discontinued in response to the NFC radio transceiver 110 transmitting the data read over the near field communication radio link to another application executing on the mobile phone, for example to store an audio tour in the memory 106 of the mobile phone 102 for later playback.

Figure 4:
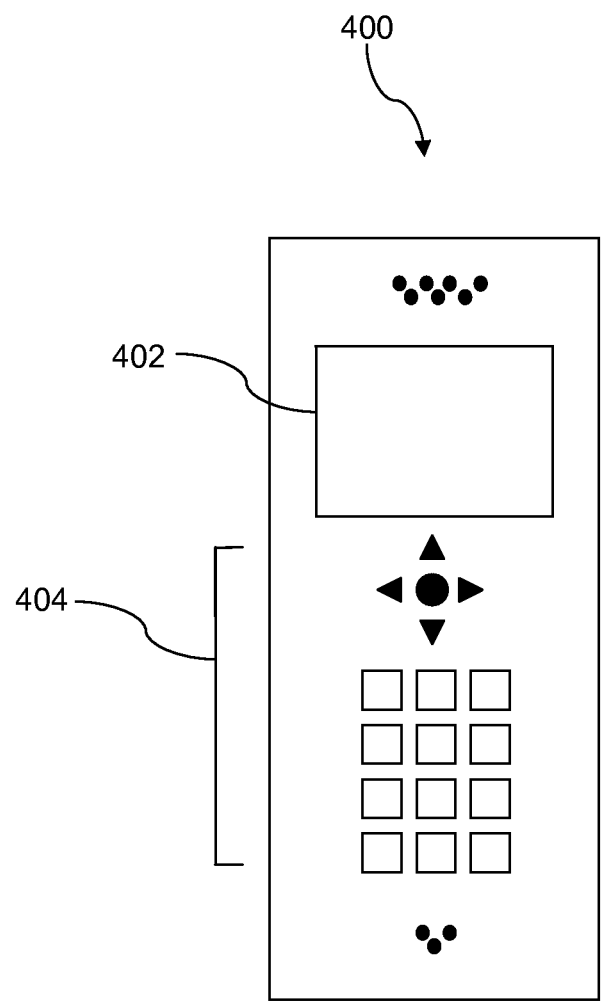
FIG. 4 is an illustration of a mobile phone according to an embodiment of the disclosure.

FIG. 4 depicts a mobile device 400, which is operable for implementing aspects of the present disclosure, but the present disclosure should not be limited to these implementations. For example, in an embodiment, the mobile phone 102 may be implemented in a form similar to that of the mobile device 400. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
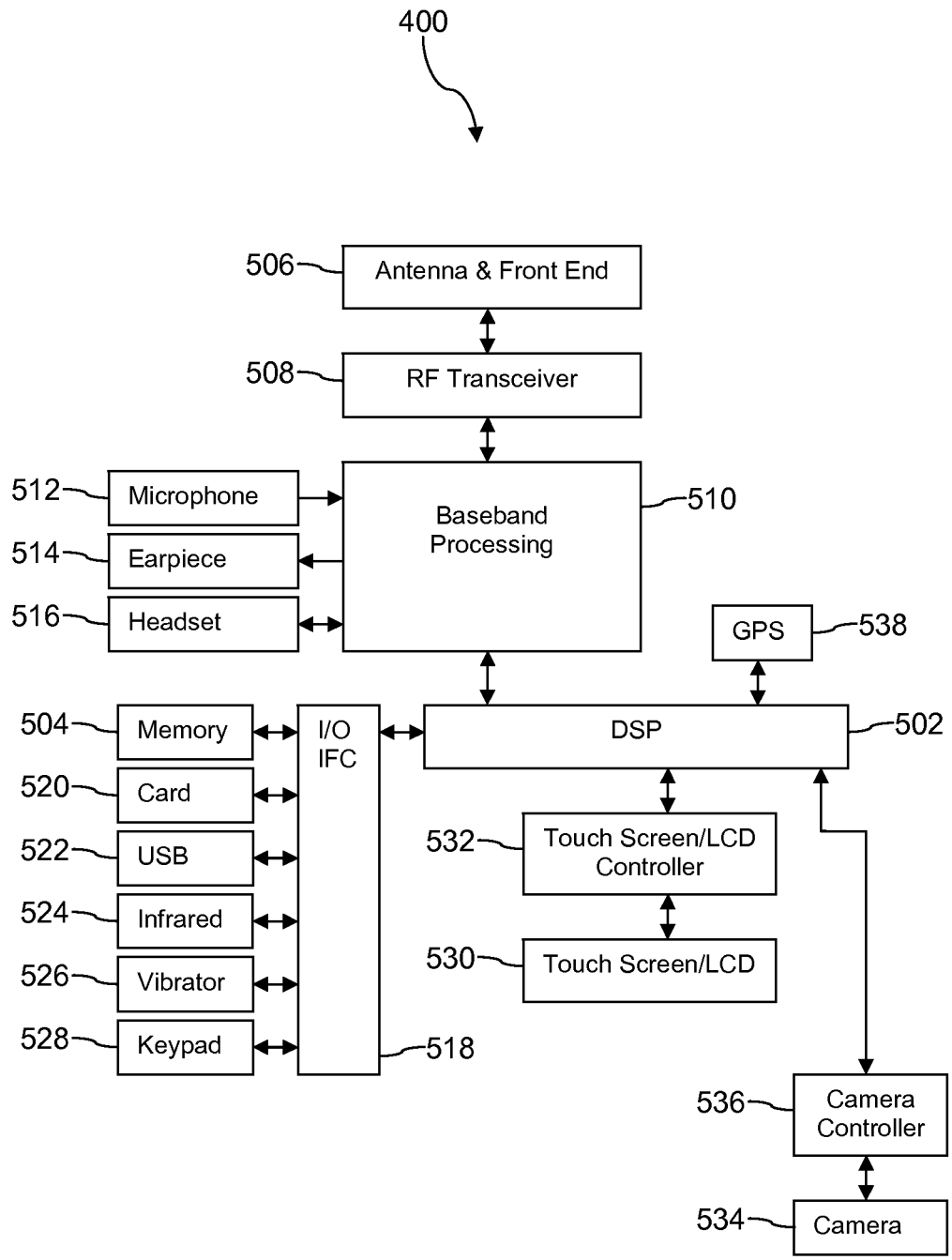
FIG. 5 is a block diagram of a mobile phone according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
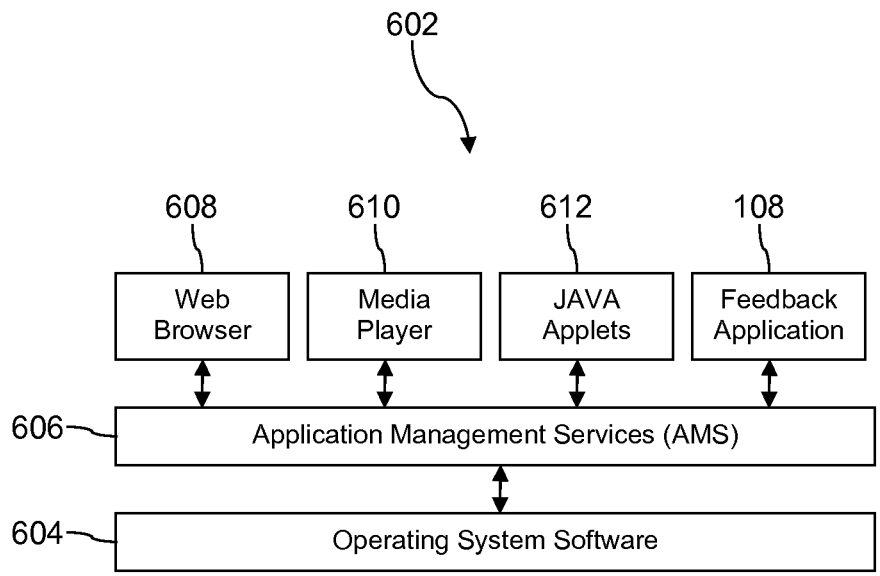
FIG. 6A is an illustration of a software architecture of a mobile phone according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, JAVA applets 612, and the feedback application 108. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. The feedback application 108 is described above.

Figure 6B:
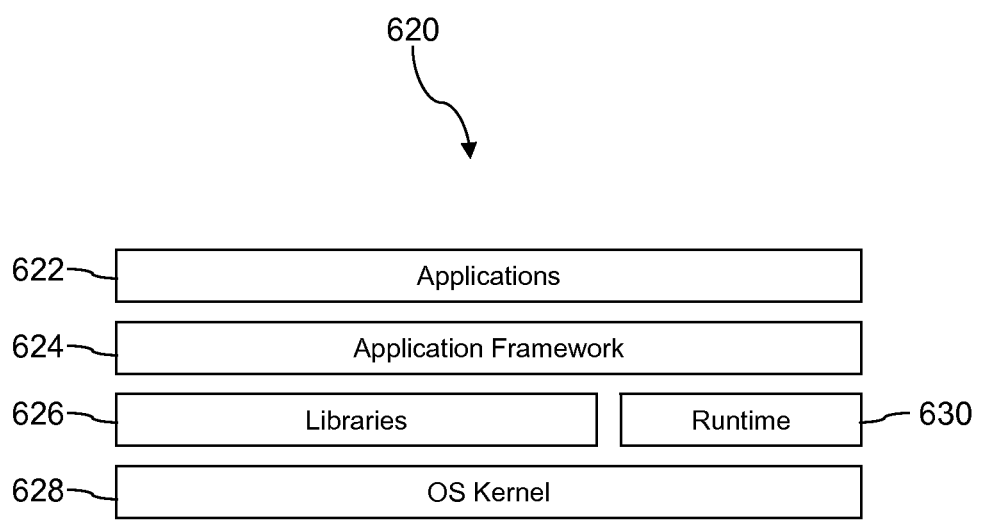
FIG. 6B is an illustration of another software architecture of a mobile phone according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
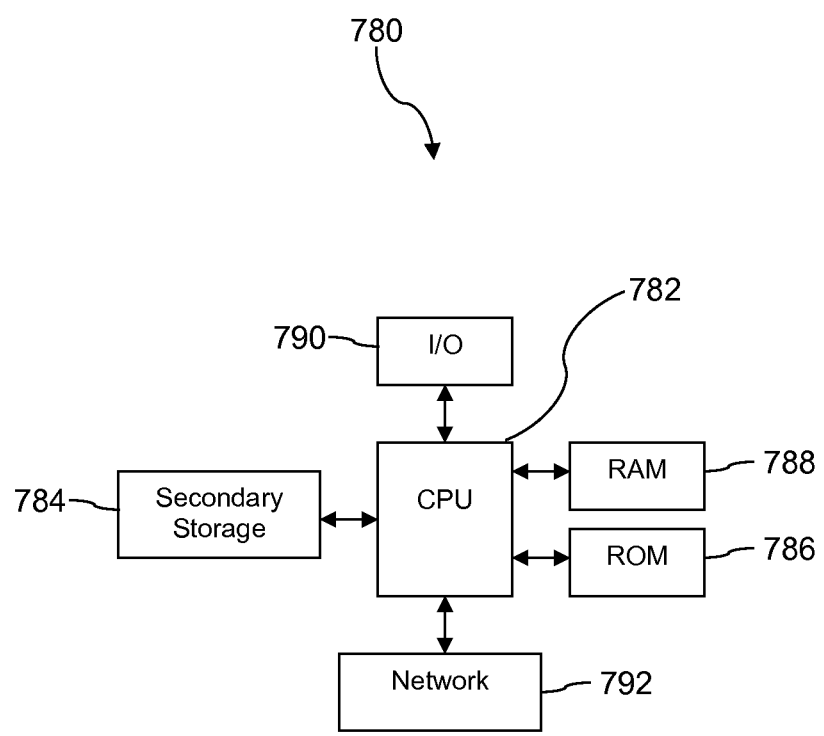
FIG. 7 illustrates a computer system according to an embodiment of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile phone, comprising:
   a cellular communication radio transceiver;
   a near field communication (NFC) radio transceiver;
   a processor;
   a memory; and
   an application stored in the memory that, when executed by the processor:
      presents an indication of an initiation of a near field communication session for data transfer via a communication link between the near field communication radio transceiver and a near field communication transceiver external to the mobile phone, and
      in response to the data transfer being completed, presents an indication of a completion of the near field communication session.

2. The mobile phone of claim 1, wherein the cellular radio transceiver communicates using one of code division multiple access (CDMA) wireless communication protocol, a global system for mobile communications (GSM) wireless communication protocol, a long-term evolution (LTE) wireless communication protocol, or a worldwide interoperability for microwave access (WiMAX) wireless communication protocol.

3. The mobile phone of claim 1, wherein one of the indications presented by the application is one of a vibration of the mobile phone, an audible tone, a visual indication on a display screen of the mobile phone, or an illumination of a light of the mobile phone.

4. The mobile phone of claim 1, wherein the application begins to present the indication of the initiation of the communication link between the near field communication radio transceiver and the near field communication transceiver external to the mobile phone when the communication link is initiated and continues to present the indication of the initiation until the communication link is terminated.

5. The mobile phone of claim 4, wherein the indication of the conclusion of the communication link between the near field communication radio transceiver and the near field communication transceiver external to the mobile phone comprises ceasing presentation of the indication of the initiation of the communication link.

6. The mobile phone of claim 1, wherein the near field communication radio transceiver sends a message from a Java virtual machine to an Android environment in which the application executes, wherein the message signals the start of the communication link.

7. A method of a mobile phone conducting a near field communication session, comprising:
   establishing a near field communication radio link between a near field communication radio transceiver of the mobile phone and a near field communication radio transceiver external to the mobile phone;
   transmitting a message from the near field communication radio transceiver of the mobile phone to an application executing on a processor of the mobile phone indicating the initiation of the near field communication radio link, wherein the message comprises an indication of a size of a data transfer to occur over the near field communication radio link; and
   in response to receiving the message, presenting an indication of the established near field communication radio link on the mobile phone by the application, wherein the indication of the established near field communication radio link is presented for a time duration determined based on the size of the data transfer.

8. The method of claim 7, wherein the near field communication radio link is established as a communicative near field communication session.

9. The method of claim 8, wherein the near field communication radio link is established to download an audio tour content.

10. The method of claim 8, wherein the near field communication radio link is established to download a poster.

11. The method of claim 7, wherein the near field communication radio link is maintained for at least five seconds.

12. The method of claim 7, further comprising discontinuing presenting the indication of the established near field communication radio link in response to the near field communication radio transceiver on the mobile phone transmitting data read over the near field communication radio link to another application executing on the mobile phone.

13. A mobile phone, comprising:
a near field communication radio transceiver;
a processor;
a memory; and
an application stored in the memory that, when executed by the processor,
presents feedback throughout the duration of a communication session of the near field communication radio transceiver until at least completion of a data transfer occurring during the communication session.

14. The mobile phone of claim 13, wherein the communication session is conducted using a communicative mode of near field communication operation and not an access mode of near field communication operation and not a financial mode of near field communication operation.

15. The mobile phone of claim 13, wherein the application ceases presenting feedback when a content uploaded during the communication session of the near field communication radio transceiver is presented by the mobile phone.

16. The mobile phone of claim 13, wherein the feedback is vibration.

17. The mobile phone of claim 13, wherein the feedback is audible.

18. The mobile phone of claim 13, wherein the feedback is visible.

19. The mobile phone of claim 13, wherein the application stored in the memory executes in an Android execution environment.

* * * * *